United States Patent [19]

Riccitiello et al.

[11] 4,156,752
[45] May 29, 1979

[54] FIRE PROTECTION COVERING FOR SMALL DIAMETER MISSILES

[75] Inventors: Salvatore R. Riccitiello; Paul M. Sawko, both of San Jose, Calif.

[73] Assignee: The United States of America as represented by the Administrator of the National Aeronautics and Space Administration, Washington, D.C.

[21] Appl. No.: 854,920

[22] Filed: Nov. 25, 1977

[51] Int. Cl.$^2$ ............................ B29D 7/14; B29D 7/20
[52] U.S. Cl. ................................. 428/220; 260/37 EP; 260/830 S; 264/102; 264/145; 264/151; 264/175; 264/236; 244/121; 428/413; 428/414; 428/418; 428/421; 428/920
[58] Field of Search ............... 264/102, 175, 145, 236, 264/151; 260/830 S, 37 EP; 428/220, 413, 421

[56] References Cited

U.S. PATENT DOCUMENTS

| | | | |
|---|---|---|---|
| 3,539,474 | 11/1970 | Sommer | 260/830 S |
| 3,635,847 | 1/1972 | Evans et al. | 260/998.1 Z |
| 3,635,880 | 1/1972 | Lamboy et al. | 260/830 S |
| 3,663,464 | 5/1972 | Sawko et al. | 260/2.5 FD |
| 3,969,314 | 7/1976 | Grigull | 260/4 Z |

OTHER PUBLICATIONS

National Aeronautics and Space Administration, CR-137706, (Jul. 1975).

*Primary Examiner*—James H. Derrington
*Attorney, Agent, or Firm*—Armand McMillan; John R. Manning; Darrell G. Brekke

[57] ABSTRACT

New, flexible intumescent protection sheeting of unusually uniform thickness have been prepared from epoxy-polysulfide compositions containing microfibers and the ammonium salt of 1,4-nitroaniline-2-sulfonic acid, as disclosed in U.S. Pat. No. 3,663,464, except that an ammonium salt particle size in the order of 5 to 8 microns and a fiber size of about 1/128th inch in length and 3 to 5 microns in diameter have been found critical to obtain the required density of 1.46 to 1.50 g/cc. The insulation sheeting is prepared by a continuous process involving vacuum mixing, calendering, and curing under very strict conditions which depend to some extent upon the thickness of the sheet produced.

The resulting flexible sheet can be wrapped easily and tightly around small diameter missiles, thus affording them for the first time, protection from fire for at least 5 minutes. The material is also suited for the protection of other articles with convoluted or contoured surfaces, which require covering of highly uniform thickness.

9 Claims, 4 Drawing Figures

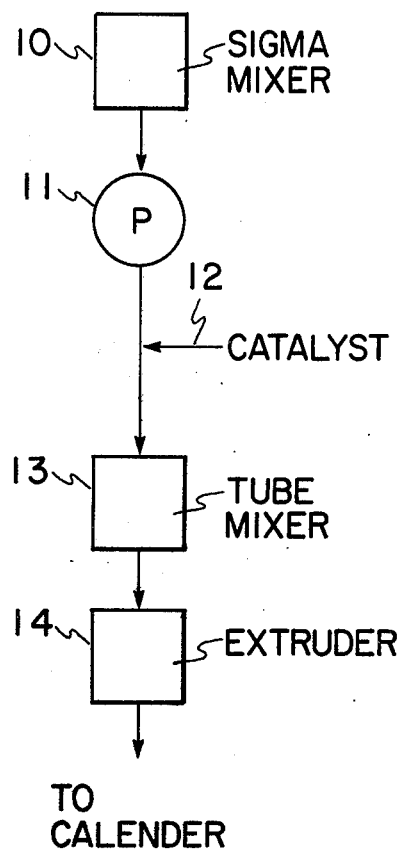
FIG. 2
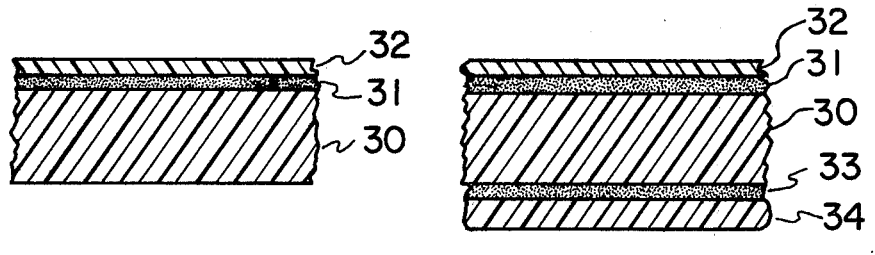
FIG. 3
FIG. 4

FIRE PROTECTION COVERING FOR SMALL DIAMETER MISSILES

ORIGIN

The invention described herein was made by employees of the United States Government and may be manufactured and used by or for the Government for governmental purposes without the payment of any royalties thereon or therefor.

FIELD OF THE INVENTION

The present invention relates to the protection of small diameter missiles from excessive heat by application of a sheet material of fiber-containing intumescent polymeric composition. The invention further relates to the fabrication of the coating sheet and to the combination of the coating with a small diameter missile.

PRIOR ART

Several thermal protective coatings have been devised for bombs, missiles and other hazardous materials, to be applied generally by spraying and by molding. These materials often contain an intumescent component which, upon exposure to elevated temperatures, produces a hard porous char of low thermal conductivity. An example of this type of protective material is disclosed in U.S. Pat. No. 3,669,299, according to which hazardous substances are protected from heat and mechanical shock by packaging in a double-walled container in which the space between the two walls has been filled with a particulate mixture of an elastomeric polymer, a moisture-liberating agent, a compatible thermosetting resin, and certain other additives. The mixture is then cured in place. In U.S. Pat. No. 3,692,682, on the other hand, there is disclosed a mixture of water-extended polyester containing a heat-proofing material, e.g., fibrous asbestos or powdered glass, which is applied as a liquid or a paste to the external or internal surface of a casing containing explosives to create a hard coating of low heat transfer characteristics.

In the case of small diameter missiles, coating attempts have been limited to spraying. The use of spray techniques, however, has so far suffered from several disadvantages. Among them can be noted the costly tendency to overspray and the need for spraying equipment at the location of missile fabrication. Also, when thicknesses greater than 0.010 inch are desired, costs are further increased by requirements for special equipment and by the greater processing times that the drying of multiple applications entails. In addition, spray techniques are subject to errors in coating thickness and yield a surface that does not meet acceptable surface finish for missiles without machining or surface sanding. As to the coating thicknesses errors, they ultimately manifest themselves in increases in missile diameter and weight which may significantly affect the performance of small diameter missiles.

In a recent report of the National Aeronautics and Space Administration, CR-137706 (July 1975), there is described a molding process requiring material prepared by means of a three-roll mill. It has been established that such a process causes variations in product uniformity and performance. The process fails to control the density and the cure to the degree necessary to achieve the desired thermal performance and mechanical properties that small diameter missiles demand. Problems also appear in the form of entrapped air, difficulty in maintaining a thickness of $0.060 \pm 0.002$ inch, a thermal performance scatter ranging from 2.5 seconds/mil to 3.2 seconds/mil and, due to variations in cure time at a given temperature, a product which can be either flexible or very brittle. Molding, in short, involves inherent difficulties with temperature and pressure control which lead to the disparities already listed.

As to the use of a three-roll mill to produce a large quantity of paste for molding, it has several shortcomings of its own. It is time-consuming. It causes particle attrition, heat build-up and promotes polymerization of the binder to yield irregular batch properties. With fibrous materials, a three-roll mill will cause major degradation and, since the fibers' function is to provide viscosity control to the coating in a fire environment, destruction of the character of the fiber will cause the fire performance to be compromised, particularly on curved structures subjected to a fire environment.

SUMMARY OF THE INVENTION

The principal object of this invention is to develop a process to fabricate a coating sheet of insulative material which can be applied on small diameter missiles for protection against heat, without interfering with the surface specifications and tolerances required by said missiles. This and other objects that shall become evident in the course of the description of the invention, have been accomplished in the following manner.

The process for fabricating the coating for small diameter missiles first involves the preparation by mixing under vacuum of an intumescent polymeric composition in which the intumescent agent, the ammonium salt of 1,4-nitroaniline-2-sulfonic acid, has a particle size of not greater than about 10 microns, and which comprises microquartz fiber about 1/64 to 1/128 inch long and about 3 to 5 microns in diameter. The polymeric component of the composition consists of a mixture of an epoxy resin with a polysulfide in proportion such that the resulting glass transition temperature is at or below room temperature. The uncured paste containing catalyst is calendered into a thin sheet, preferably between 0.010 and 0.100 inch in thickness, and is rapidly cured within 20 minutes under precisely controlled conditions which depend to some extent on the thickness of the sheet. The cured sheet which may or may not be covered by a protective polymer skin such as a polyvinyl fluoride film, is then attached to the surface of the missile with a flexible adhesive by means of the vacuum bag technique.

DESCRIPTION OF THE DRAWINGS

The invention can be better understood by referring to the following figures in which:

FIG. 2 continues with the process by which the insulation sheeting is manufactured;

FIG. 3 shows, in cross-section, the type of sheet obtained by the process of FIG. 1; and FIG. 4 illustrates, also in cross-section, an insulation sheet applied to a metal substrate such as the wall of a small diameter missile.

DETAILED DESCRIPTION OF THE INVENTION

Figure 1:
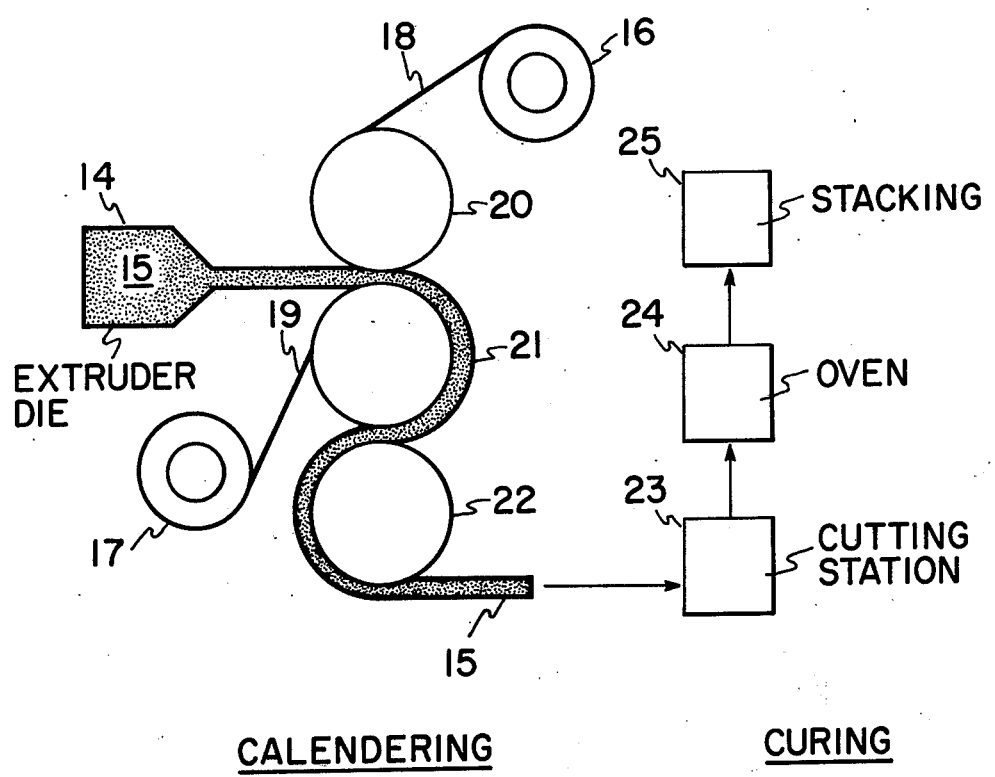
FIG. 1 represents schematically the process for preparing the compositions used in the practice of this invention.

The materials employed for the preparation of the insulative sheet of this invention have been described by Sawko in U.S. Pat. No. 3,663,464 and that document is therefore incorporated by reference into this specification. These materials consist generally of mixtures of epoxy resins with polysulfides having a molecular weight ranging from about 600 to 8000 which contain, for intumescence purposes, a significant quantity of the ammonium salt of 4-nitroaniline-2-sulfonic acid. A typical mixture will be described more specifically in the examples. In order that the intumescent compositions of Sawko be used successfully as covering for small diameter missiles, critical size tolerances have had to be observed in the selection of the particulate substances employed, namely the powdered intumescent agent and the inorganic fibers. Thus, it has been discovered that the particle size of the ammonium salt cannot be higher than about 10 microns in average diameter, about 5 to 8 microns being preferred, in order that a critical sheet material density of 1.46 to 1.50 g/cc be achieved. Similarly, the inorganic fibers required must be limited to between about 1/64 to 1/128 inch in length and about 3 to 5 microns in diameter, the shorter fibers being preferred.

The effectiveness of the insulating material of this invention in terms of density is illustrated in Table 1 in terms of the time, in seconds per mil of insulation thickness, that the back surface of a 0.060 inch center isolated steel substrate exposed to fire will take to reach the temperature of 204° C. This particular temperature is critical with respect to detonation of several types of ordnance and to incipient degradation and fatigue of many alloys.

TABLE 1.

| EFFECT OF DENSITY, $\rho$ ON THERMAL PERFORMANCE | |
|---|---|
| $\rho$ g/cc | Time to Reach 204° C.,* sec/mil |
| 1.25 | 2.0 sec/mil |
| 1.30 | 2.0 sec/mil |
| 1.35 | 1.8 sec/mil |
| 1.41 | 2.6 sec/mil |
| 1.49 | 3.3 sec/mil |

*204° C. is potential reaction temperature of ordnance.

As can be readily calculated from the data in the table, a preferred 60 mil coating with a density of 1.49 g/cc will protect a substrate for about 200 seconds, as opposed to about 110 seconds for a 1.35 g/cc coating of the same thickness. When a 60 mil insulation sheet of 1.49 g/cc density is applied to a small diameter missile, the metal structure has a heat capacity such that it does not reach 204° C. before 5 minutes of exposure to fire, i.e., well within the military specifications for this type of assembly. It should be noted here that both the density and the thickness of the coatings must be extremely uniform in order that any benefit be obtained from their presence. Heretofore, this uniformity could not be achieved by available materials and spraying techniques and, for that reason, small diameter missiles were generally not protected since the coatings produced not only would fail as insulation but also would interfere with their ballistic and aerodynamic performance.

The process for preparing the compositions from which the sheet insulation is fabricated can be visualized by referring to FIG. 1 which shows a sigma mixer 10 into which the binder and intumescent components are added and thoroughly mixed together in vacuo. The purpose of this operation is to produce a uniform mix that does not contain any entrapped air. Air pockets, localized reductions in density, and voids act as thermal breaks in the coating and furthermore, serve as loci for environmental corrosion. The fibers, preferably quartz fibers, are then mixed in, again under vacuum, and the resulting uncatalyzed paste may be stored until needed for sheet production, for example, for a period of about 7 days at −10° C. or up to about 30 days at dry ice temperature. Preferably, however, the catalyst 12 is immediately added and thoroughly dispersed in the paste by mixing under vacuum in tube mixer 13. Catalyzed paste 15 then passes to extruder 14 for placement between calendering rolls 20 and 21. As can be seen in FIG. 2, the paste is then extruded onto a continuous sheet of release paper 19 supplied from stock reel 17. An example of a satisfactory release paper is a 70 lb. bleached Kraft paper coated on both surfaces with 1 mil (0.0254 mm) polyethylene and a silicone resin at the rate of 0.2–0.4 lb. per ream.

As FIG. 2 shows, a chemically inert and weather resistant film 18 made, for example, of polyvinyl fluoride, can be applied upon the upper surface of the extruded paste in the form of a continuous sheet supplied from stock reel 16. The resulting sandwich is then passed consecutively between rolls 20 and 21 and between rolls 21 and 22 which are so positioned that a sheet thickness within the range of about 0.010 to about 0.100 inch is imparted to the finished product. It should be noted here that the release paper surface may be embossed with any desired pattern, said pattern being transferred in due course to the surface of the cured sheet composition.

After having been formed by calendering rolls 20, 21 and 22, the sheet insulation is cut at station 23 in lengths suitable for wrapping individual missiles or other articles. The lengths are then cured in oven 24 under conditions that shall be presently desribed, and they are stacked in storage cabinet 25.

A critical point in the sheet-forming process is that any delay between calendering and curing the intumescent composition after the catalyst has been added should not exceed 20 minutes at ambient temperature. However, it is possible, when necessary, to store the uncured material at low temperatures, e.g., at −80° C., but not for periods longer than two days. Under such conditions, premature polymerization of the binder is minimized.

One of the most critical aspects of the preparation of insulation material for small diameter missiles is the curing process, i.e., the time and temperature selected for the cure. This criticality is illustrated in Table 2 where it can be seen that a 60 mil coating preheated in an oven at 90° C. for five minutes achieves the required flexural properties after a total time of 10 minutes at that temperature. In contrast, both shorter and longer cure times are ineffective.

TABLE 2.

| EFFECT OF CURE TIME AND TEMPERATURE ON FLEXURAL PROPERTIES | | | |
|---|---|---|---|
| Cure Temp., °C. | Time, min. | Elongation, % | Observed Component Property State |
| 90 | 5 | 5.6 | Cheesy |
| 90 | 10 | 7.9 | Elastic |
| 90 | 15 | 6.8 | Brittle |

Note: All samples were placed in preheated oven at 90° C. A period of 5 min. was required for the 60 mil samples to reach temperature in the particular tests conducted.

Evidently, coatings with thicknesses greater or smaller than 60 mils will take more or less time than 5 minutes to reach 90° C., i.e., some period within the range of about 1 to 6 minutes, but in any case, the actual residence time at 90° C. must be limited to 5 minutes +30 seconds–0 seconds if useful properties are to be achieved. A typical time-temperature cure schedule for a 60 mil sheet is shown in the following table.

TABLE 3

TYPICAL TIME-TEMPERATURE CURE SCHEDULE FOR THERMAL PROTECTION SHEET STOCK

| Time, min. | Temperature of Sample, °C. | Oven Temperature, °C. |
|---|---|---|
| 1 | 24 | 93 |
| 2 | 84 | 90 |
| 3 | 88 | 90 |
| 4 | 89 | 93 |
| *5 | 90 | 93 |
| 6 | 92 | 93 |
| 7 | 92 | 93 |
| 8 | 92 | 93 |
| 9 | 92 | 93 |
| 10 | 92 | 93 |

*Cure time start (temperature reaches quasi steady state)

An alternative method for applying the protective polyvinyl fluoride film to the surface of the insulation sheet of this invention is to do so after the sheet has been made. In such a case, a thin layer of conventional flexible epoxy adhesive, e.g., Scotweld 22-16, is applied to the surface of the sheet, the film is vacuum bagged into place to avoid trapped air and insure intimate interfacing, and the assembly is then left under reduced pressure, e.g., 30 mm HG for about 16 hours at ambient temperature (~20° C.). A cross-sectional elevation of a film-covered insulation sheet such as that just described is shown in FIG. 3 in which can be seen a layer of intumescent coating (30), covered by a layer of adhesive (31) and a polyvinyl fluoride film (32). Proportions have not been respected in order to show the two top layers in sufficient detail. The preferred overall thickness for the layers of this assembly is 0.060±0.002 inch, including between about 0.002 to 0.004 inch for the adhesive, and about 0.002 inch for the top film. It should be recalled that when the top film is applied directly to the uncured intumescent paste at the calendering stage, no adhesive need be employed since bonding takes place upon curing said intumescent paste.

The attachment of the intumescent thermal protection sheet to a missile surface is also achieved by means of a flexible epoxy adhesive which acts as a strain isolator. An assembly of this type is shown in FIG. 4, composed of a top protective film layer (32), an epoxy glue layer (31), an intumescent layer (30), a second epoxy glue layer (33), and the metal substrate from the missile (34). To construct this assembly, the release paper is first removed from the sheet surface and that bared surface is lightly scuffed to remove any sheen or release agent present. The surface is then dusted by vacuum to remove all loose particles. The adhesive is applied by mechanical means to a thickness no greater than about 0.010 inch nor thinner than 0.004 inch. The sheet is then heated at 50° C. for 5 minutes to cause it to soften and it is wrapped around the small diameter (10 inch or less) missile. The adhesive is then cured in place by means of a vacuum bag for 16 hours at ambient temperature.

After the adhesive has been cured, the missile is removed from the vacuum bag and inspected. The seams and joints, if any, are filled with a grout material having the same formulation as the calendered material, and this grout is allowed to cure for 24 hours at ambient temperature. A polyvinyl fluoride film strip is then placed on the grouted surface to close the gap between the edges of the polyvinyl fluoride film forming the outer covering of the missile.

An alternative procedure involves the use of a polyvinyl fluoride sheet which extends beyond the area of the base thermal protection sheet during and after calendering. This extension or flap can then serve to cover the joint area formed on wrapping the insulation around the missile, thus greatly simplifying the process.

As disclosed earlier, the materials used in the present compositions and their proportions are generally listed in U.S. Pat. No. 3,633,464. However, in addition to the preferences and criticalities already recited in the present disclosure, the following parameters have also been found relevant to the success of the present fire protection system.

Thus it has been found that the proper mechanical properties are achieved when the polymeric components of the composition constitute from about 19.5 to 22.5% for the epoxy resin and about 16.0 to 19.0% for the polysulfide, of the final calendering mix, excluding catalyst and solvents. As to the non-polymeric ingredients, the composition should contain between about 61 and 63% of such materials, namely the intumescent agent and the fiber, with the balance, i.e., about 37 to 39%, being accounted for by polymers. However, as little as 20% and as much as 95% intumescent agent, based on the weight of the polymers used, can be employed depending on the particular polymeric components and proportions selected.

The microfibers, which may be either of organic or inorganic nature, should preferably constitute between 2 and 10% of the composition, while the amine curing agent, when employed, can be present at a level of up to about 12% of the epoxy resin weight.

The invention will now be illustrated in greater detail by means of the following non-limiting example which describes a most preferred embodiment.

EXAMPLE

An intumescent formulation is first prepared from the following ingredients according to the teachings of U.S. Pat. No. 3,663,464:

|  | Parts by Weight |
|---|---|
| Epoxy Resin (Epon 828) | 21.4 |
| Polysulfide (LP-3) | 17.1 |
| 1,4-Nitroaniline-2-sulfonic acid, ammonium salt | 56.5 |
| Silica microfibers | 5.0 |
| Tris-(dimethylaminomethyl) phenol | 2.5 |

The epoxy resin employed was of the epichlorohydrin-bisphenol A type and had an average molecular weight of 380, an epoxide equivalent within the range of 185 to 192 and a viscosity of about 130 poises. The polysulfide was a mercaptan-terminated polymer of the formula

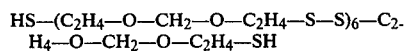

with an average molecular weight of 1000, an average viscosity of 10 poises at 25° C. and a mercaptan content of 6 percent with 2 percent cross-linking. The ammonium salt was used in the form of fine particles, i.e., having an average diameter of about 5 to 8 microns. The silica microfibers had an average length of about 1/128 inch and an average diameter of about 3-5 microns.

The first four ingredients were mixed in a sigma mixer under vacuum in the manner described earlier and, after incorporation of the curing agent, i.e., the tertiary amine, by continued mixing under vacuum for 5 minutes, the paste was calendered into a sheet having a thickness of 0.060±0.002 inch. A silicone coated paper and a 0.002 inch thick polyvinyl fluoride (Tedlar) sheet were applied to the intumescent mixture during calendering, as shown in FIG. 2. In this manner, the need for an adhesive layer was obviated.

When the resulting insulation sheet was applied to a small diameter missile as previously described, and the resulting assembly tested by placing it in a pool fire of 5000 gallons JP-5 fuel, a period of 409 seconds elapsed before ordnance reaction, as opposed to a period of 45 to 60 seconds for uncoated missiles of the same caliber. These results are illustrated in the following table.

TABLE 4

THERMAL PERFORMANCE ON MISSILE WARHEADS
ENVIRONMENT: MISSILE PLACED IN POOL FIRE
(5000 GALLONS OF JP-5 FUEL)

| Missile (Thermal Protection System) | Time to Reaction, Seconds |
|---|---|
| No Coating | 45 to 60 |
| 60 Mils Coating | 409 |

While the thermal insulation material of the present invention, its preparation, and its principal use have been described in sufficient detail to enable those skilled in the art to practice these various aspects of said invention, it is contemplated that changes can be made in these processes, materials and uses without department from the spirit and the scope of the following claims.

What is claimed is:

1. A process for the manufacture of thermal protection sheeting of uniform composition and thickness, which comprises:

preparing by vacuum mixing an intumescent paste which comprises: (a) an epoxy resin and (b) a mercaptan-terminated polysulfide polymer having a molecular weight within the range of 600 to 8000, said resin and polymer being present in proportions such that the glass transition temperature of the mixture is at or below room temperature, (c) 20 to 95% by weight, based on the resin-polymer mixture, of ammonium 4-nitroaniline-2-sulfonate having a particle size not greater than about 10 microns; (d) about 2 to 10 parts by weight of microfibers having an average length of within the range of about 1/64 to 1/128 inch and an average diameter of 3 to 5 microns; and (e) up to about 12% of the epoxy resin weight of an amine curing agent;

calendering the paste to form a sheet having a thickness within the range of about 0.010 to 0.100 inch;

cutting the sheet obtained into missile wrapping lengths; and within 20 minutes of the amine curing agent addition, heating the sheet rapidly to 90° C. and keeping it at 90° C. for a period of exactly 5 to 5.5 minutes.

2. The process of claim 1 wherein the epoxy resin and the polysulfide polymer contents of the paste before addition of the amine curing agent are within the range of about 19.2 to 22.5% and 16.0 to 19.0 by weight, respectively.

3. The process of claim 1 where the intumescent paste comprises, on a weight basis, about 37 to 39% of the epoxy resinpolysulfide polymer mixture, about 51.5 to 59.5% of the ammonium salt and about 2 to 10% of the microfibers, said last two ingredients constituting about 61 to 63% of the composition dry weight before addition of the amine curing agent.

4. The process of claim 1 wherein the intumescent paste comprises on a weight basis:
about 21.4 parts of the epoxy resin,
about 17.1 parts of the polysulfide polymer,
about 56.5 parts of the ammonium salt at an average particle size of 5 to 8 microns,
about 5 parts of the microfibers having an average length of 1/128 inch and an average diameter of 3-5 microns and about 2.5 parts of the amine curing agent.

5. The process of claim 4 wherein the epoxy resin is an epichlorohydrin-bisphenol A type having a molecular weight of about 400, and the polysulfide has the formula $$HS-(C_2H_4-O-CH_2-O-C_2H_4-S-S)_6C_2H_4O-CH_2-O-C_2H_4-SH.$$

6. The process of claim 5 wherein the microfibers are made of silica and the curing agent is tris-(dimethylaminomethyl) phenol.

7. Fire protection intumescent sheeting of very uniform thickness and composition prepared by the process of claim 1.

8. The sheeting of claim 7 covered on one of its surfaces of a thin environmentally resistant and mechanically polymeric film.

9. The sheeting of claim 8 where the film consists of a polyvinyl fluoride having a thickness of about 0.002 inch.

* * * * *